(12) United States Patent
Jainek et al.

(10) Patent No.: US 6,224,758 B1
(45) Date of Patent: May 1, 2001

(54) FILTER ASSEMBLY

(75) Inventors: Herbert Jainek, Heilbronn; Jaroslav Pavlin, Freiberg; Roland Wiederhold, Cologne, all of (DE)

(73) Assignee: Filterwerk Mann & Hummel GmbH, Ludwigsburg (DE)

( * ) Notice: Subject to any disclaimer, the term of this patent is extended or adjusted under 35 U.S.C. 154(b) by 0 days.

(21) Appl. No.: 09/463,321

(22) PCT Filed: Jul. 11, 1998

(86) PCT No.: PCT/EP98/04305

§ 371 Date: Apr. 7, 2000

§ 102(e) Date: Apr. 7, 2000

(87) PCT Pub. No.: WO99/04880

PCT Pub. Date: Feb. 4, 1999

(30) Foreign Application Priority Data

Jul. 23, 1997 (DE) .............................................. 197 31 556

(51) Int. Cl.[7] .......................... B01D 35/147; B01D 35/18
(52) U.S. Cl. ........................... 210/186; 210/130; 210/440
(58) Field of Search .................................. 210/186, 130, 210/440

(56) References Cited

U.S. PATENT DOCUMENTS

| 3,142,640 | * | 7/1964 | Otto, Jr. . |
| 5,374,355 | * | 12/1994 | Habiger et al. . |
| 5,413,712 | * | 5/1995 | Gewiss et al. . |
| 5,538,626 | * | 7/1996 | Baumann . |
| 5,548,893 | * | 8/1996 | Koelfgen . |
| 5,589,060 | * | 12/1996 | Gebert et al. . |
| 5,695,633 | * | 12/1997 | Ernst et al. . |
| 5,888,383 | * | 5/1999 | Cox . |
| 5,888,384 | * | 5/1999 | Wiederhold et al. . |
| 5,895,568 | * | 4/1999 | Koltunov . |
| 6,068,763 | * | 5/2000 | Goddard . |
| 6,117,312 | * | 9/2000 | Mees et al. . |

FOREIGN PATENT DOCUMENTS

| 4240656 | * | 7/1993 | (DE) . |
| 259594 | * | 3/1988 | (EP) . |
| 580491 | * | 1/1994 | (EP) . |
| 723796 | * | 7/1996 | (EP) . |
| 773054 | * | 5/1997 | (EP) . |
| 2465507 | * | 4/1981 | (FR) . |

* cited by examiner

*Primary Examiner*—Thomas M. Lithgow
(74) *Attorney, Agent, or Firm*—Evenson, McKeown, Edwards & Lenahan, P.L.L.C.

(57) ABSTRACT

A filter assembly for a liquid to be filtered, especially for use in a conditioning unit for the lubricating oil of a motor vehicle, including a filter cartridge (8) concentrically arranged around a center tube (9) through which a liquid stream may flow. The filter assembly includes a bypass valve (11) through which unfiltered liquid can flow into the center tube (9) if the filter cartridge becomes clogged. The bypass valve (11) is durably affixed by a valve plate (21) so that a valve body (16) is urged against the valve plate (21) by a valve spring (19) supported by supports (20) extending axially in the center tube (9).

7 Claims, 2 Drawing Sheets

FILTER ASSEMBLY

BACKGROUND OF THE INVENTION

The invention relates to a filter arrangement for a liquid to be filtered, with a bypass valve.

Oil filter arrangements for the filtration of the lubricant oil in a motor vehicle are known, in which a replaceable paper filter cartridge is inserted into the oil circuit. A central tube is inserted or snapped into the housing of the oil filter, and over it the hollow cylindrical filter cartridge is placed. The oil to be cleaned is conveyed to the exterior of the paper layers of the filter cartridge and flows through the filter cartridge and through the openings of the central tube, which is lattice-like as a rule, into the interior of the central tube, and from there through an outlet back into the oil circuit.

In order to assure a flow of oil even in the event of clogging or similar operational disturbances, a bypass valve is provided in a bypass passage in the filter arrangement, which opens if the pressure of the oil being filtered is too high, and assures a flow of oil to the outlet.

SUMMARY OF THE INVENTION

It is the object of the invention to further develop a filter arrangement of the kind described above in such a way that a simple manufacture and a compact construction can be achieved.

The filter arrangement of the invention has, in an advantageous manner, a bypass valve which is easy to integrate into the central tube of the filter arrangement during manufacture. For this purpose the central tube is provided with an annular constriction of its diameter, into the interior of which the bypass valve with the valve body and the valve spring can initially be loosely inserted.

As support for the valve body axially extending supports are arranged in the central tube behind the diameter constriction, wherein the supports have cut outs which are matched to the contour of the valve body with the spring in such a way that the supports function as a valve cover. In this stage of manufacture with the valve spring in the uncompressed state, the valve seat of the valve body, by which the sealing surface is produced after assembly is complete, extends slightly beyond the diameter constriction. The central tube, the diameter constriction and the star-shaped supports situated in the interior can be easily manufactured in one piece as an injection-molded synthetic resin part.

The functional bypass valve is formed in a simple manner by a valve plate which is durably fastened on the outside of the diameter constriction for sealing contact with the valve seat of the valve body against the pressure of the valve spring. The valve plate, which optionally may also be coated with elastomer at the valve seat, is advantageously produced of synthetic resin and is affixed to the diameter constriction of the central tube, for example by ultrasonic welding or spin welding or by crimping or by snapping by means of sealing lips.

In accordance with the invention, the bypass valve can be integrated into a simply produced central tube with just a few working steps. The valve body can initially be preassembled together with the valve spring and loosely inserted into the supports which function as a valve cover, and can then be secured in a single manufacturing step by attaching the valve plate.

The filter arrangement according to the invention thus makes an extremely compact construction possible with a simple manufacturing method, so that, when the filter arrangement is used in a conditioning unit for the lubricating oil in a motor vehicle, installation will be simple. For this purpose the filter arrangement with its housing cover can be attached onto a base body which contains an oil/coolant heat exchanger and a further bypass valve for the oil/coolant heat exchanger. Furthermore, an oil cooler is attached to the base body, preferably of aluminum or synthetic resin.

BRIEF DESCRIPTION OF THE DRAWINGS

A working embodiment of the filter arrangement according to the invention is explained with reference to the drawing.

DETAILED DESCRIPTION OF PREFERRED EMBODIMENTS

Figure 1:
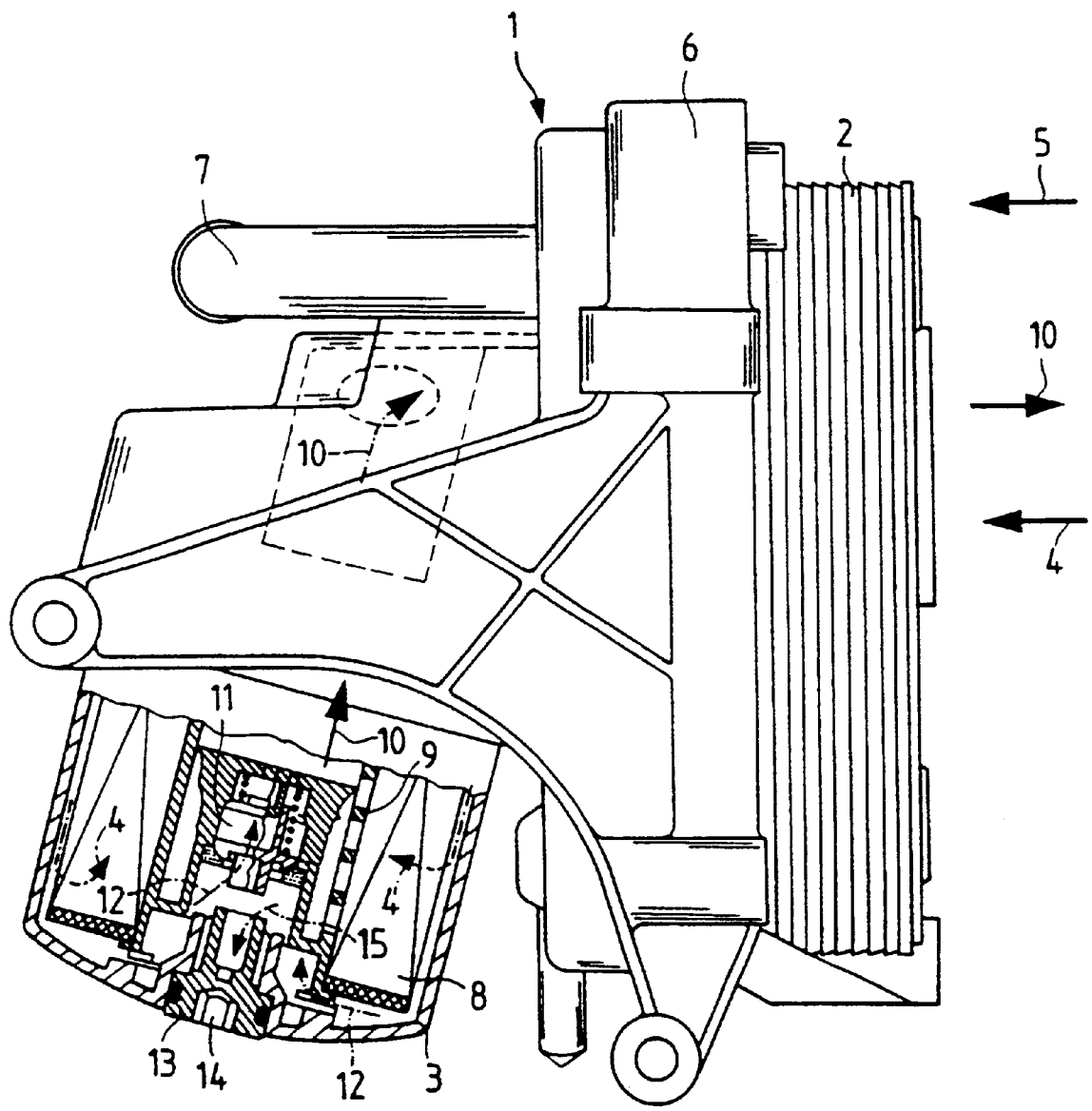
FIG. 1 shows a filter arrangement in a conditioning unit for the lubricating oil of a motor vehicle.

In FIG. 1 there is shown a conditioning unit 1 for the lubricating oil of a motor vehicle, in which the oil to be filtered is conducted through an oil cooler 2 into a filter arrangement 3 (arrow 4). On the conditioning unit 1 there is also an inlet for the coolant (arrow 5). The coolant, which as a rule is the cooling water for the internal combustion engine, is conducted through an oil/coolant heat exchanger 6 to an outlet 7. Here there is another bypass valve, not visible in FIG. 1, for the oil/coolant heat exchanger 6. In the filter arrangement a metal-free filter cartridge 8 is disposed on a central tube 9. The oil is passed through the filter paper layers of the filter cartridge and through openings in the central tube 9 into the interior of the central tube 9 and then to the outlet (arrow 10) of the conditioning unit 1.

In the central tube 9 a bypass valve 11 is disposed, through which an oil stream can be conducted via bypass channels (arrows 12) past the filter cartridge 8 to the outlet. A drain plug 13 can be unscrewed from the housing of the filter arrangement by means of a wrench socket 14, so that the lubricating oil present in the conditioning unit 1 and perhaps ready to be replaced, can be drained out (arrow 15).

Figure 3:
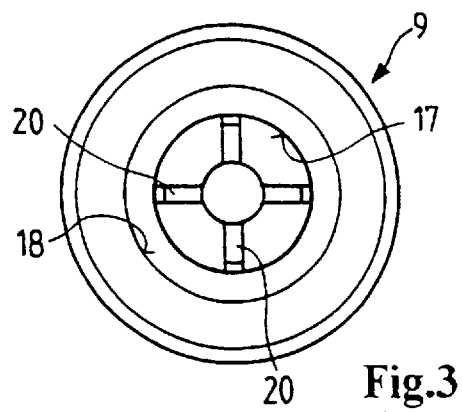
FIG. 3 shows a view of the central tube before installation of the bypass valve.
Figure 4:
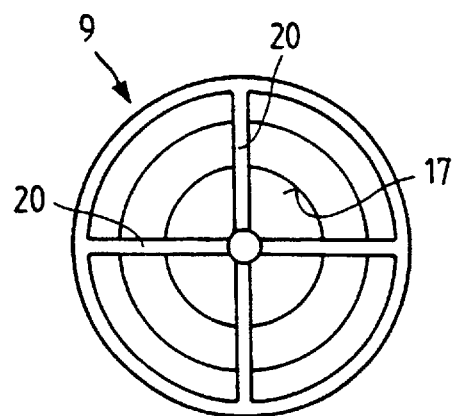
FIG. 4 shows a view of the central tube with the supports for receiving the bypass valve.

The construction and operation of the bypass valve 11 in the central tube 9 of the filter arrangement 3 will be explained below with reference to FIGS. 2, 3 and 4. The bypass valve 11 has a valve body 16 which can be inserted into the inner aperture 17 of a diameter constriction 18 in the central tube 9. In this case the diameter constriction 18 is disposed axially in the middle of the central tube 9 so that the end face of the bypass valve 11 does not protrude out of the central tube 9.

After insertion the valve body 16 lies on top of a valve spring 19 in a recess in the supports 20, whereby the supports 20 form the abutment for the valve spring 20. The position of the supports 20 can be seen especially in FIGS. 3 and 4. FIG. 3 shows a view of the central tube 9 (viewed in the direction in which the bypass valve 11 is inserted, but without the bypass valve 11) so that the supports 20 which serve as an abutment for the valve spring 19, can be seen. FIG. 4 shows the supports 20 in a rear view into the central tube 9 (seen from above in the plane of drawing of FIG. 2). In this case the bypass valve 11 comes to lie in the internal bore 17. The central tube 9, the diameter constriction 18 and the supports 20 are preferably a one-piece injection molded part.

Figure 2:
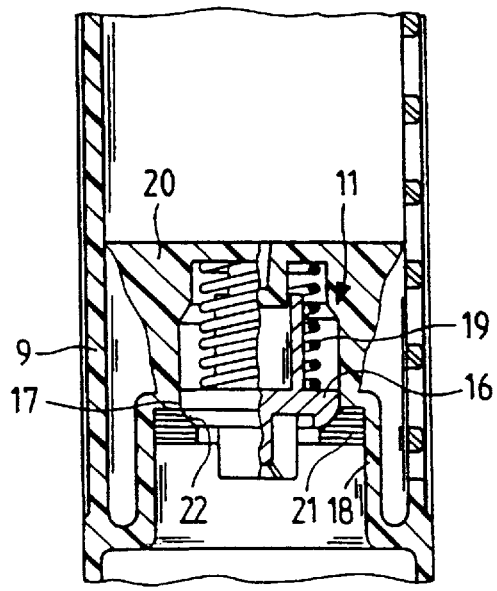
FIG. 2 shows a detail view of a section of the central tube of the filter arrangement with a bypass valve.

In FIG. 2 the position of the bypass valve in the finally installed state can be seen. Before the final installation the valve body 17 protrudes slightly past the margin of the diameter constriction 18 due to the uncompressed valve spring 19. To complete the bypass valve 11, a valve plate 21, preferably of synthetic resin material, is pressed down against the diameter constriction 18 with a slight force which is transferred through the valve seat 22 to the valve body 16 and to the valve spring 19, and fastened there. The attachment is preferably effected by ultrasonic or friction welding or by clamping and sealing or by adhesive bonding.

Thus, due to the force of the valve spring 19, the bypass valve 11 in its rest position has a closed valve seat 22. Upon an increase in the pressure of the oil which is to be filtered above the central tube 9, the valve body is forced downward against the force of the valve spring 19 and thus opens the valve seat 22 to permit flow therethrough.

What is claimed is:

1. A filter arrangement for a liquid to be filtered, comprising a filter housing, a center tube through which liquid can flow arranged centrally in said housing, and an annular filter cartridge disposed around said central tube; said housing having an inlet opening outside said filter cartridge and an outlet opening from said center tube, whereby liquid to be filtered can flow from said inlet radially inwardly through said cartridge and into said center tube and thence out said outlet; said filter arrangement further comprising a normally closed bypass valve communicating between the outside of said filter cartridge and inside said center tube through which the liquid can pass directly inside said center tube if said filter cartridge becomes clogged; said bypass valve comprising an annular diameter constriction formed in said center tube, a valve body disposed in said diameter constriction, axially extending supports arranged in said central tube behind said diameter constriction, said supports defining a recess in which said valve body is received, a valve spring disposed between said valve body and said supports, and a valve plate inserted after said valve spring and valve body and durably affixed adjacent said diameter constriction such that the valve spring urges a valve seat on the valve body against the valve plate.

2. A filter arrangement according to claim 1, wherein said supports extend radially from said center tube toward the tube axis along a portion of the length of said center tube.

3. A filter arrangement according to claim 1, wherein the center tube, the diameter constriction, and the supports together comprise a one piece as an injection molded synthetic resin part.

4. A filter arrangement according to claim 1, wherein said valve plate is coated with elastomer where said valve seat on said valve body is urged against it.

5. A filter arrangement according to claim 1, wherein said valve plate is made of synthetic resin material and is affixed adjacent said diameter constriction by ultrasonic welding, spin welding, adhesive bonding, or crimping with sealing.

6. A conditioning unit for conditioning lubricating oil in a motor vehicle, comprising, in combination, a base body, an oil cooler, an oil/coolant heat exchanger, an exchanger bypass valve for bypassing the oil/coolant heat exchanger, and a filter arrangement according to claim 1, attached to said base body.

7. A conditioning unit according to claim 6, wherein said base body is an aluminum casting or a molded synthetic resin part and is provided with connections and interior passages for conducting lubricating oil and coolant to and from said oil/coolant heat exchanger and for conducting lubricating oil to and from said filter arrangement.

* * * * *